United States Patent Office 3,575,893
Patented Apr. 20, 1971

3,575,893
COPOLYMERS CONTAINING PHENYLDIMETHYL CARBINOL GROUPS
Hans-Josef Buysch and Heinrich Krimm, Krefeld-Bochum, Hermann Schnell, Krefeld-Urdingen, and Georg Malamet, Krefeld, Germany, assignors to Farbenfabriken Bayer Aktiengesellschaft, Leverkusen, Germany
No Drawing. Filed June 25, 1968, Ser. No. 739,659
Claims priority, application Germany, July 11, 1967, F 52,917; July 12, 1967, F 52,931; Apr. 26, 1968, P 17 70 272.6
Int. Cl. C08f 15/00, 47/10
U.S. Cl. 260—2.5
4 Claims

ABSTRACT OF THE DISCLOSURE

Copolymers containing phenyldimethyl carbinol groups, crosslinked plastics comprising said copolymers and foams of the crosslinked copolymers. The processes for preparing the copolymers, crosslinked copolymers and foams are also disclosed.

---

It was surprising that the process according to the invention, through an uncomplicated smooth reaction, should provide novel, linear uncrosslinked and soluble copolymers with carbinol groups which are eminently suitable for use as plastics or for the production of plastics. The reason for this is that $\alpha$-methylstyrene, which is similar in structure to the isopropenylphenyl dimethyl carbinols used in accordance with the present invention, is known to be extremely difficult to homopolymerise through radical initiation, giving oligomers as the end product. The sluggishness in reaction of $\alpha$-methylstyrene is also noticeable when it is radically copolymerized with other, more reactive, vinyl monomers, for example, styrene, so that fairly high temperatures and prolonged reaction times have to be employed, particularly when it is intended to include fairly large quantities of $\alpha$-methylstyrene in the polymers.

It is also known from the literature that phenyldimethyl carbinols have very little thermal stability. For example, when phenyl dimethyl carbinol is distilled under normal pressure, it is readily converted into $\alpha$-methylstyrene, accompanied by the elimination of water. By virtue of their structure as phenylogues of allylcarbinols, isopropenylphenyl dimethyl carbinols can be expected to be even more labile. Accordingly, diisopropenyl benzenes were expected to be formed, and hence the polymers obtained were expected to be crosslinked and insoluble under the polymerisation conditions.

p- and m-Isopropenylphenyl dimethyl carbinols and mixtures thereof may be used as the starting products in the process according to the invention. They may be polymerised to form copolymers in quantities of from about 0.01 to 50 mol percent, and preferably in quantities of from 1 to 35 mol percent.

Suitable comonomers for the isopropenyl dimethyl carbinols include almost any copolymerisable olefinically unsaturated monomers, providing they do not contain any reactive groups that react with the hydroxyl group in the carbinols. Even if they contain such reactive groups, however, the reaction conditions can usually be varied in such a way as to prevent the reactive groups from reacting with the carbinol. The following olefinically unsaturated monomers are examples of suitable comonomers:

(a) $\alpha,\beta$-Olefinically unsaturated monocarboxylic acids, and derivatives thereof, such as acrylamides and methacrylamides, acrylonitrile and methacrylonitrile, esters of acrylic acid and methacrylic acid, in particular those with saturated monohydric aliphatic or cycloaliphatic alcohols having from 1 to 20 carbon atoms, for example, esters of the aforementioned acids with methyl, ethyl, propyl, isopropyl, isobutyl, hexyl, octyl or stearyl alcohol, or with cyclohexanol, methylcyclohexanol, benzyl alcohol, phenol, cresol, or furfuryl alcohol: and mono esters of $\alpha,\beta$-mono olefinically unsaturated monocarboxylic acids having 3 or 4 carbon atoms with dihydric saturated aliphatic alcohols having from 2 to 4 carbon atoms, for example 2-hydroxyethyl methacrylate, 2-hydroxypropyl methacrylate, 4-hydroxybutyl methacrylate, 2-hydroxyethyl acrylate, 2-hydroxypropyl acrylate, and 4-hydroxybutyl acrylate.

(b) Aromatic monovinyl compounds such as styrene, $\alpha$-methyl styrene, vinyl toluene, m- and p-isopropyl-$\alpha$-methyl styrene, p-chlorostyrene or other nuclear-substituted vinyl benzenes. The less readily polymerised monomers such as $\alpha$-methyl styrene and m- and p-isopropenyl-$\alpha$-methyl styrene are always polymerised in admixture with at least one of the copolymerisation components mentioned in (a)–(h), (c) Esters of vinyl alcohol with carboxylic acids or with hydrohalic acids, vinyl ethers and vinyl ketones; such as vinyl chloride, vinylidene chloride, vinyl acetate, vinyl propionate, vinyl ethyl ether, vinyl isobutyl ether and vinyl methyl ketone, (d) Conjugated diolefins with from 4 to 6 carbon atoms such as butadiene, isoprene, 2,3-dimethyl butadiene and chloroprene, (e) N-methylol ethers of acrylic or methacrylic acid amide having the following general formula

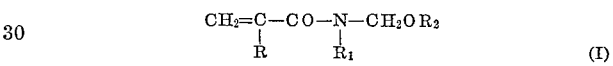

in which R represents hydrogen or methyl, $R_1$ represents hydrogen, alkyl, aralkyl or aryl and $R_2$ represents alkyl or cycloalkyl, for example methyl, ethyl, n-propyl, isopropyl, n-butyl, isobutyl or cyclohexyl (cf. German Auslegeschrift 1,035,363).

(f) Mannich bases of acrylic and methacrylic acid amides corresponding to the general formula:

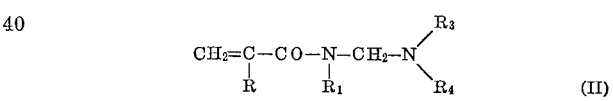

in which R and $R_1$ have the same meanings as in Formula I, whilst $R_3$ and $R_4$ each represents an alkyl or cycloalkyl group or, together with the nitrogen atom to which they are attached, represent a heterocyclic radical, such as a morpholino radical. Suitable compounds of this type are mentioned in German Auslegeschrift No. 1,102,404.

(g) Acrolein and methacrolein, (h) Diesters and monoesters of maleic acid, fumaric acid and itaconic acid with from 1 to 18 carbon atoms in the alcohol moiety, also maleic anhydride, maleic acid and fumaric acid, amides of maleic acid and fumaric acid, maleic imides and unsaturated copolymerisable polyesters containing the radicals of maleic acid and fumaric acid as their main acid moieties.

It is also possible to use other mono-olefinically unsaturated comonomers, such as styrene sulphonic acid, or unsaturated aliphatic or cycloaliphatic hydrocarbons. Cross-linking monomers with two or more unconjugated olefinically usaturated groups may also be used, although they are less desirable, in quantities of from about 0.01 to 5% by weight and preferably in quantities of from 0.03 to 3% by weight, based upon the total weight of the monomers, such as glycol diacrylate, glycol dimethacrylate, acrylic acid and/or methacrylic acid allyl ester, divinyl benzene, triacryloyl perhydro-s-triazine, triallyl cyanurate or substitution products of these compounds.

The following monomers are preferably used for the copolymerisation reaction:

Acrylic acid and methacrylic acid; their methyl, ethyl butyl, 2-hydroxy ethyl and 2-hydroxypropyl esters; their nitriles and their amides and the N-methylol ethers of the amides; styrene; α-methyl-styrene; p-chlorostyrene; butadiene; isoprene; fumaric acid and maleic acid dimethyl and diethyl ester and unsaturated copolymerisable polyesters containing radicals derived from maleic acid or fumaric acid as their main acid moiety.

Copolymers may be prepared either from two or even from a larger number of monomers belonging to various classes of compounds. The type of monomers used will depend upon the properties required of the copolymers.

Copolymerisation may be carried out in bulk, in solution, in emulsion, in suspension or as precipitation polymerisation.

The polymers may readily be prepared by graft or block copolymerisation (in the context of this application, these two alternatives are both included under copolymerisation), in which case one or more of the monomers is initially polymerised and then one or more of the residual monomers polymerised to completion with the copolymer.

Suitable polymerisation catalysts include inorganic peroxide compounds, such as potassium or ammonium persulphate; hydrogen peroxide; percaronates; and organic peroxide compounds such as acylperoxides, for example benzoyl peroxide; alkyl hydroperoxides such as tert. butyl hydroperoxide, cumene hydroperoxide or p-menthane hydroperoxide; and dialkyl peroxides such as di-tert.-butyl peroxide. The inorganic or organic peroxidic compounds are advantageously used in combination with reducing agents as known per se. Sodium pyrosulphite or bisulphite, ferrous salts and cobalt naphthenate are examples of suitable reducing agents.

Metal complexes, such as acetyl acetonates of manganese and cobalt and diacyl peroxide/tert.-amine systems are also suitable. Elevated temperatures and intense and energetic radiation may also be used to initiate polymerisation.

Copolymerisation is preferably carried out with radical-forming substances, such as azodiisobutyrodinitrile, benzoyl peroxide and potassium persulphate/sodium sulphite.

The quantity in which the catalyst is used lies conveniently within the limits normally imposed, i.e. between about 0.01 and 5% by weight, based on all the monomers used.

When copolymerisation is carried out in aqueous medium, it is possible to use cation-active, anion-active or even non-ionic emulsifiers, and combinations of these emulsifiers.

The following are examples of suitable anionic emulsifiers: higher fatty acids, resin acids, acid fatty alcohol sulphuric acid esters, higher alkyl sulphonates and alkyl aryl sulphonates, sulphonated castor oil, higher oxalkyl sulphonates, sulphosuccinic acid esters, salts of fatty acid condensation products with oxalkyl carboxylic acids, aminoalkyl carboxylic acids and the water-soluble salts of sulphonated ethylene oxide adducts.

Examples of cationic emulsifiers include salts of alkyl amines, aryl alkyl aryl or resin amines and inorganic acids, as well as salts of quaternary ammonium compounds. Suitable non-ionic emulsifiers include the reaction products, known per se, of ethylene oxide with long-chain fatty alcohols such as cetyl, lauric, oleyl or octadecyl alcohol or phenols such as octyl or dodecyl phenol. Reaction products of more than 10 mols and preferably from 15 to 30 mols of ethylene oxide with 1 mol of fatty alcohol or phenol are particularly preferred.

The emulsifiers referred to above may be used in a total quantity of from 0.5 to 20% by weight, based on the total amount of monomers. They are preferably used in quantities of from 2 to 10% by weight.

Polymerisation can be carried out at a temperature from about −20 to +150° C. and preferably at a temperature from +20 to +100° C.

Copolymerisation may be carried out in the presence of compounds that regulate molecular weight, such as long-chain alkyl mercaptans and diisopropyl xanthogenate. Fillers may also be used.

The copolymers obtained in accordance with the invention, having molecular weights of up to 500,000, may be stored for unlimited periods either at room temperature or at a slightly higher temperature (approximately 50° C.). The copolymers of the invention contain the reactive dimethyl carbinol groups which facilitate further reactions involving the end polymer.

Since the monomeric isopropenyl phenyl dimethyl carbinols can be obtained in highly pure form either by distillation or by recrystallisation, the preparation of water-white and glass-clear copolymers is a particularly conspicuous advantage of the process according to the invention.

The novel copolymers may be used as plastics with outstanding properties.

In the context of this application, plastics include mouldings, coatings, coverings, electrical insulating materials, impregnations, lacquer films, laminates, and moulding compositions.

The copolymers aforementioned may be crosslinked simply by heating them to temperatures in the range from 100 to 250° C. and preferably in the range from 120 to 200° C., in the presence or absence of atmospheric oxygen. To shorten the reaction time and/or to lower the reaction temperatures, heating may also be carried out in the presence of catalysts.

The copolymers may be crosslinked either in bulk in solution or in aqueous dispersion.

When crosslinking is carried out in solution, organic solvents may be used, for example aromatic hydrocarbons or mixtures thereof, in particular benzene, toluene or xylene; ketones such as methyl ethyl ketone; chlorinated hydrocarbons such as chloroform, methylene chloride, dichloroethane or chlorobenzene; glycol monomethyl ether; glycol dimethyl ether; dioxan; cyclohexanone; and mixtures thereof.

The following compounds are examples of catalysts that may be used in the process according to the invention:

(a) Radical formers such as tert.-butyl hydroperoxide, cumeme hydroperoxide, di-tert.-butyl peroxide, dibenzoyl peroxide, methyl isobutyl ketone peroxide, benzpinacone, redox systems, for example comprising cyclohexanone peroxide and cobalt naphthenate, dibenzoyl peroxide and amines, hydrogen peroxide and ferrous salts, or potassium persulphate and sodium hydrogen sulphite. High-energy radiation may also be used.

(b) Acids such as hydrochloric acid; sulphuric acid; phosphoric acid, boric acid; arsenic acid; ethane sulphonic acid; p-toluene sulphonic acid; naphthalene disulphonic acid; propane-2-phosphonic acid; chloromethane phosphonic acid; phenylmethane phosphonic acid; benzene phosphonic acid; naphthalene phosphonic acid; thiophene-2-phosphonic acid; acetylphosphonic acid; benzene boronic acid; benzene arsenic acid; formic acid; acetic acid; dichloroacetic acid; trifluoroacetic acid; trichloroacetic acid, acrylic acid; maleic acid; fumaric acid; terephthalic acid; 1,4,5,6,7,7 - hexachloro - bicyclo - [2,2,1]-hept-5-ene-2,3-dicarboxylic acid; picric acid; polymethacrylic acid; and acid ion exchangers.

(c) NH- and CH-acid compounds such as p-toluene sulphonamide; benzene disulphonamide; sulphonyl urea; bis-(p-toluene sulphonyl) amine; and dibenzene sulphonyl methane.

(d) Acid anhydrides such as sulphur trioxide, phosphorus pentoxide, sodium metaphosphate, acetic anhydride, maleic anhydride, hexahydrophthalic anhydride and methane sulphonic acid anhydride; and mixed anhydrides of boric acid with carboxylic acids such as maleic acid, fumaric acid, itaconic acid, phthalic acid, hexahydrophthalic acid, tetrahydrophthalic acid, adipic acid and succinic acid, which mixed anhydrides, on the one hand, may contain free carboxyl groups and, on the other hand, free B—OH and boric acid anhydride groups.

(e) Acid halides such as disulphur dichloride, sulphur dichloride, thionyl chloride, sulphuryl chloride, arsenic trichloride, phosphorus pentachloride, acetyl chloride, propionyl bromide, benzoyl fluoride, terephthalic acid dichloride, chloroformic acid phenyl ester and p-toluene sulphochloride.

(f) Acid esters such as diphenyl sulphite, diethyl sulphate, dimethyl phosphite, triphenyl phosphite, monophenyl phosphate, diphenyl phosphate, tributyl phosphate, boric acid tricyclohexyl ester, o-silicic acid tetraethyl ester, titanic acid tetraethyl ester and benzene sulphonic acid methyl ester.

(g) Acid and neutral salts such as acid Li, Na, K, Mg, Ca, Ba, Zn, Al and Pb salts of benzene phosphonic acid, phosphoric acid phenyl ester, the acid sodium salt of boric acid phenyl ester, neutral Li, Na, K, Mg, Ca, Ba, Zn, Al and Pb salts of butane phosphonic acid, magnesium hexafluorosilicate, zinc hexafluorosilicate, Na, K, Ca, Mg, Zn and Al-formate, acetate, octoate, stearate, dibutyl tin dilaurate, magnesium sulphate, calcium sulphate, triethylamine hydrochloride, dimethyl aniline hydrochloride, pyridine hydrochloride, quinoline hydrochloride and dimethyl benzylamine acetate.

(h) Lewis catalysts such as hydrogen fluoride, silver perchlorate, magnesium chloride, calcium chloride, zinc chloride, tin chloride, boron fluoride, aluminum chloride, aluminum bromide, ferric chloride, titanium tetrachloride, and antimony pentachloride, or adducts thereof such as boron fluoride etherate, boron fluoride triethylamine, boron fluoride pyridine and boron fluoride acetamide and solid catalysts, which may also be employed in fairly large quantities as fillers, such as aluminum oxide, iron oxide, titanium dioxide, sulphur, polysulphides, active carbon and fuller's earth.

The catalysts may be used in quantities of from 0.001 to 20% by weight and preferably in quantities of from 0.1 to 5% by weight, based on the solids content. The catalysts referred to above may also be used in admixture with one another.

In some instances, it may also be of advantage to carry out crosslinking in stages by heating the copolymers in the presence of weak acids as catalysts, such as glacial acetic acid (in this case up to an excess by weight of catalyst based on solids content), then completely crosslinking the isolated copolymer, optionally in the presence of one of the aforementioned catalysts, for example in the presence of radical formers, for example organic peroxides, or high energy radiation.

It was surprising that the copolymers containing phenyl dimethyl carbinol groups should lend themselves so readily to crosslinking through a simple, smooth reaction to form plastics showing outstanding service properties. In particular, the crosslinked products show outstanding hardness, elasticity and high resistance to solvents, depending upon the composition of the copolymers. Coatings and films of the crosslinked copolymers are colourless and show outstanding bond strength.

In the process for the production of crosslinked plastics water is split off from the phenyl dimethyl carbinol groups of the aforementioned copolymers, resulting in the formation of isopropenyl groups which are subsequently polymerised to form crosslinked products. If the crosslinking reaction is carried out under conditions in which the water split off can escape, homogeneous plastics are obtained, the process is, therefore, particularly suitable for the production of coatings. If, however, it is desired to obtain mouldings with fairly large layer thicknesses by this process, the process is carried out in two stages, in the first of which the water is split off from the aforementioned copolymers under conditions which are so controlled as to prevent the polymers from cross-linking, after which these uncrosslinked polymers containing free isopropenyl groups are moulded and subjected to conditions under which crosslinking takes place through polymerisation of the isopropenyl groups.

If the crosslinking reaction is carried out under conditions in which the water split off is not able to escape cross-linked foams are obtained showing a uniformly fine-cell structure, improved mechanical properties and high thermal stability under load.

In the process according to the invention, foams based on crosslinked copolymers are obtained:

(a) By polymerising polymerisable mixtures of isopropenyl-phenyl-dimethylcarbinols, olefinically unsaturated carboxylic acids, or acid or acid-forming derivatives thereof, and optionally at least one further copolymerisable monomer stated under a–h and polymerisation catalysts, accompanied by crosslinking and foaming, or (b) Pre-polymerising mixtures according to (a) and crosslinking and foaming the resulting polymers containing dimethyl carbinol groups by heating, or (c) Crosslinking and foaming copolymers of olefinically unsaturated monomers containing isopropenyl-phenyl-dimethyl-carbinols and at least one further copolymerisable monomer stated under (a)–(h) which is free of acid groups at elevated temperature in the presence of catalysts.

The following acid monomers are suitable for use in the process according to the invention:

$\alpha,\beta$-Olefinically unsaturated monocarboxylic or polycarboxylic acids, such as acrylic acid, methacrylic acid, maleic acid, fumaric acid or itaconic acid; anhydrides of these acids such as maleic anhydride or itaconic anhydride; and half esters of $\alpha,\beta$-olefinically unsaturated carboxylic acids with aliphatic, cycloaliphatic or araliphatic alcohols such as monoethyl fumarate. The following compounds may also be mentioned in this connection: Partial esters of polybasic carboxylic acids which do not contain any polymerisable multiple bond, with olefinically unsaturated alcohols, such as monoallyl phthalate.

In one embodiment of the invention, copolymerisation of the aforementioned monomers is carried out in such a way that polymerisation and foaming take place at the same time to form a crosslinked foam.

For this purpose, a mixture of polymerisable carboxylic acids, or their acid or acid-forming derivatives, and isopropenylphenyl-dimethylcarbinols and other vinyl monomers are heated at temperatures above 60° C. in the presence of radical formers.

The ratio by weight of polymerisable carboxylic acid, or its derivative, to the polymerisable tertiary alcohol may be from 3:1 to 1:3, and the ratio by weight of the mixture of polymerisable carboxylic acid, or its derivative, and of the polymerisable tertiary alcohol to the other vinyl monomers from 1:5 to 1:1.

When the process is carried out, the water split off from the tertiary alcohol during polymerisation acts as the expanding agent. However, the polymerisation catalysts that are preferably used have the same effect when employed in an excess. It is also possible to carry out polymerisation in the presence of additional expanding agents, for example organic compounds that are volatile at the foaming temperature, such as aliphatic hydrocarbons, for example butane, pentane, hexane or heptane; aromatic hydrocarbons, such as benzene or cumene; halogenated hydrocarbons such as methylene chloride or dichloro difluoromethane; and expanding agents known per se which decompose at the foaming temperature accompanied by the elimination of gases, such as azodicarbonamide or diphenyl sulphone-3,3'-disulphohydrazide.

In another preferred embodiment of the process according to the invention, the mixture of monomeric vinyl compounds, polymerisable carboxylic acids or their derivatives, isopropenyl-phenyl-dimethyl-carbinols and radical formers, is polymerised in a first stage at a temperature below 60° C. either in bulk or in aqueous suspension, optionally in the presence of additional expanding agents, to give products that for the most part are only weakly crosslinked.

The quantities in which the individual copolymerisation components are used may be varied as desired within the limits specified above.

The copolymers obtained in this way may then be converted into a crosslinked foam in a second stage by heating at a temperature in the range from 100 to 250° C. and preferably in the range from 150 to 220° C. The foaming time varies from 1 to 30 minutes and is preferably from 3 to 15 minutes.

The unit weight of the foams according to the invention may be varied as desired from approximately 30 to 800 kg./m.$^3$.

In another embodiment of the invention, it is possible to obtain crosslinked foams by crosslinking uncrosslinked copolymers in which the aforementioned tertiary alcohols are present and which can be free of acid groups, in the presence of the catalysts aforementioned and optionally in the presence of the aforementioned additional expanding agents, at elevated temperature under such conditions known per se that the expanding agents expand the crosslinked polymer that is formed.

The percentages mentioned in the examples are by weight unless otherwise stated.

PRODUCTION OF THE STARTING MATERIALS

Test 1

A mixture of 400 g. p-phenylene-bis-(dimethylcarbinol) and 2 litres of 10% aqueous acetic acid is heated in a nitrogen atmosphere with stirring and under reflux. After about ¾ hour, the biscarbinol has dissolved and two liquid phases have formed. Boiling is terminated and the two phases are separated while still hot. The organic phase is shaken with a dilute sodium hydroxide solution and then mixed with about 1 litre of petroleum ether. 179 g. of unreacted biscarbinol crystallise upon cooling. They are filtered off. After evaporation of the petroleum ether from the solution, there remain 185 g. of a residue which consists of 93.7 percent by weight p-isopropenyl-phenyl-dimethylcarbinol, 4.4 percent by weight p-diisopropenylbenzene and 1.8 percent by weight of unreacted biscarbinol. This mixture is separated into its components by fractional distillation. Conversion of biscarbinol: 55%. Yield of p-isopropenylphenyl-dimethylcarbinol: 86% of theory, referred to converted biscarbinol.

Melting point 40–41° C., boiling point 78–80° C./0.3 mm. Hg.

*Analysis.*—Calc'd (percent): C, 81.77; H, 9.15; O, 9.08. Found (percent): C, 81.5; H, 9.38; O, 8.98.

Iodine number according to Braee.—Found: 153. Calc'd: 144.

Test 2

The process is carried out as described in Test 1, but the 2 litres of diluted acetic acid are replaced with 400 ml. glacial acetic acid and boiling under reflux is terminated after 1 hour. The reaction solution is then poured into water, the aqueous phase is separated, if necessary, with the aid of petroleum ether.

There are obtained 339 g. of a mixture consisting of 49% p-diisopropenyl benzene, 48% p-isopropenylphenyl-dimethylcarbinol and unreacted biscarbinol. Conversion of biscarbinol: 97%.

Yield of p-isopropenylphenyl-dimethylcarbinol: 46% of theory, referred to converted biscarbinol.

Test 3

The experiment is repeated according to test 2, but with the use of m-phenylene-bis-(dimethylcarbinol). Conversion of biscarbinol: 66%.

Yield of m-isopropenylphenyl-dimethylcarbinol: 71% of theory, referred to converted biscarbinol.

Melting point 44–45° C., boiling point 72–74° C./0.2 mm. Hg.

*Analysis.*—Calc'd (percent): C, 81.77; H, 9.15; C, 9.08. Found (percent): C, 82.2; H, 9.03; C, 9.37.

Iodine number according to Braee.—Found: 161. Calc'd: 144.

EXAMPLE 1

15.0 g. of freshly distilled styrene and 1.50 g. of p-isopropenylphenyl dimethyl carbinol are dissolved in 45 ml. of toluene, 0.01 g. of azodiisobutyronitrile are added as starter and the solution is polymerised for 70 hours at 100° C. in a nitrogen atmosphere. The polymer is precipitated by pouring it into 300 ml. of methanol with vigorous stirring, followed by filtration, drying, solution in 50 ml. of toluene and reprecipitation with 300 ml. of methanol. After washing with methanol, filtering and drying, 12.5 g. of a colourless polymer are left behind. Yield 75% by weight of the theoretical. Analysis shows that the polymer has an oxygen content of from 0.83 to 0.90% by weight.

Assuming that isopropenylphenyl dimethyl carbinol is included in the polymer in the same proportion in which it is present in the starting mixture, the calculated oxygen content amounts to 0.83%. This value is fairly consistent with the observed value, bearing in mind that a polystyrene prepared in a parallel test under exactly the same conditions has an oxygen content of from 0.06 to 0.09% by weight.

An attempt to homopolymerise p-isopropenylphenyl dimethyl carbinol is described in the following comparison test.

0.1 g. of azodiisobutyronitrile is added to 12.0 g. of p-isopropenylphenyl dimethyl carbinol, and the resulting mixture is stored for 50 hours at 60 to 70° C. The product is then taken up in 20 ml. of toluene, and the resulting solution is poured into 200 ml. of petroleum ether (boiling point 60 to 70° C.). 0.12 g. of a colourless polymer are are obtained after filtering, washing and drying.

A mixture similar to that described above, except that it is kept at 90 to 100° C., gives the same results.

The comparison test shows that p-isopropenylphenyl dimethyl carbinol cannot effectively be radically homopolymerised.

EXAMPLE 2

15.0 g. of freshly distilled styrene and 3.0 g. of p-isopropenylphenyl dimethyl carbinol are dissolved in 45 ml. of toluene, and the resulting solution is polymerised and worked up as described in Example 1. A colourless polymer with an oxygen content of from 1.52 to 1.57% by weight (calculated 1.52% by weight) is obtained in a yield of 13.2 g.

If this test is carried out with ten times the quantity of reactants under otherwise the same conditions, a polymer is obtained in a yield of 159 g. or 88% of the theoretical. The oxygen content is 1.58 to 1.65 by weight.

EXAMPLE 3

The polymerisation is carried out with the same mixture and in the same way as described in Example 1 with the exception that instead of 0.01 g. of azodiisobutyronitrile, 0.01 g. of benzoyl peroxide is used as the initiator. 11.5 g. of polymer with an oxygen content of from 0.76 to 0.78% by weight are obtained.

EXAMPLE 4

The reaction mixture and procedure are as in Example 2. 0.01 g. of benzoyl peroxide is used instead of azodiisobutyronitrile as the initiator. 12.5 g. of polymer with an oxygen content of 1.19 to 1.23% by weight are obtained.

Polystyrene prepared in a parallel test contains from 0.07 to 0.09% by weight of oxygen.

The copolymers prepared in accordance with Examples 1 to 4 are investigated for the purposes of comparison: Bands for OH— and C—O groups, and for 1,4-substituted aromatic compounds appear in the infra red spectrum. The intensity of the bands increases as follows: Copolymer of Example 3<Example 1<Example 4<Example 2. This series is consistent with the oxygen content.

|  | Polymer from Example No. | | | Polystyrene according to the parallel test of Example 4 |
| --- | --- | --- | --- | --- |
|  | 2 | 3 | 4 |  |
| Relative viscosity (toluene) | 1.208 | 1.192 | 1.187 | 1.174 |
| Molecular weight (viscosimetric) | 87,000 | 78,000 | 75,000 | 69,000 |

EXAMPLE 5

400 g. of freshly distilled styrene and 100 g. of m-isopropenylphenyl dimethyl carbinol are dissolved in 500 ml. of toluene, 0.50 g. of azodiisobutyronitrile is added to the resulting solution which is then polymerised for 44 hours at 90° C. in the presence of nitrogen. After precipitation by 4 to 5 litres of methanol, filtration, washing and drying, a colourless polymer with an oxygen content of from 1.95 to 2.18% by weight is obtained in a yield of 289 g.

EXAMPLE 6

50.0 g. of freshly distilled styrene and 50.0 g. of freshly distilled p-isopropenylphenyl dimethyl carbinol are dissolved in 300 ml. of toluene and, following the addition of 0.5 g. of azodiisobutyronitrile as initiator, the resulting solution is polymerised at 90° C. in a nitrogen atmosphere. After a reaction time of 70 hours, the polymer is precipitated twice by 2 litres of methanol, 70.2 g. of polymer with a relatively viscosity of 1.220 (toluene) and an oxygen content of from 3.90 to 4.10% by weight, corresponding to a carbinol content of from 43 to 45% by weight, are obtained.

EXAMPLE 7

40.0 g. of freshly distilled acrylonitrile and 10.0 g. of p-isopropenylphenyl dimethyl carbinol are emulsified with stirring in 120 ml. of freshly distilled water to which 0.5 g. of sodium lauryl sulphate has been added, in a nitrogen atmosphere, and the resulting mixture is polymerised with 0.01 g. of benzoyl peroxide at 70 to 80° C. After 2½ hours, excess monomer is removed by blowing in steam, and the polymer which is precipitated by the addition of methanol is suction filtered, washed and dried. The yield of 41.8 g.=83% by weight of the theoretical. Examination by infra-red spectroscopy reveals a content of 18% by weight of 1,4-substituted aromatic compounds.

EXAMPLE 8

80.0 g. of methyl methacrylate, 10.0 g. of acrylonitrile and 20.0 g. of p-isopropenylphenyl dimethyl carbinol are emulsified in 200 ml. of water (all substances freshly distilled) with the aid of 0.8 g. of sodium lauryl sulphate. Following the addition of 0.05 g. of potassium persulphate and 0.02 g. of sodium sulphite, polymerisation is carried out with stirring in a nitrogen atmosphere over a period of 3 hours at a temperature rising from 40 to 70° C. The polymer is precipitated by pouring the emulsion into 1.5 litres of methanol, followed by filtration and repeated washing with methanol. A polymer which is soluble in chloroform is obtained in a yield of 98.0 g. after drying.

EXAMPLE 9

Following the addition of 0.02 g. of azodiisobutyronitrile, 40.0 g. of freshly distilled ethyl acrylate and 10.0 g. of p-isopropenylphenyl dimethyl carbinol are polymerised for 24 hours at 70 to 80° C. in 100 ml. of xylene under a nitrogen atmosphere. The polymer solution is added dropwise with vigorous stirring to 500 ml. petroleum ether, and precipitates (isopropenylphenyl dimethyl carbinol itself is readily soluble in petroleum ether). Following isolation and drying, 48.0 g. of polymer with a relative viscosity (CHCl₃) of 1.20 are obtained.

According to NMR-analysis (nuclear magnetic resonance spectrum), the molar ratio of acrylate to p-isopropenylphenyl dimethyl carbinol in the copolymer is 8 to 1. This corresponds to the molar ratio of the two monomers in the mixture, within the limits of error.

EXAMPLE 10

Following the addition of 0.20 g. of azodiisobutyronitrile, 10.0 g. of methyl methacrylate and 2.00 g. of p-isopropenylphenyl dimethyl carbinol are polymerised at 60 to 70° C. in a nitrogen atmosphere. The mixture solidifies after some 15 hours. The polymer is taken up in chloroform and purified by repeated precipitation in methanol. Yield: 11.2 g. of colourless polymer corresponding to 93% of the theoretical. A 1,4-substituted aromatic compound was detected by infra-red spectroscopy and was found to be present in the polymer in a quantity of 18% by weight.

EXAMPLE 11

35.0 g. of ethyl acrylate and 15.0 g. of p-isopropenylphenyl dimethyl carbinol are dissolved in 50 ml. of xylene and the resulting solution is polymerised at 70 to 80° C. in a nitrogen atmosphere following the addition of 0.20 g. of azodiisobutyronitile. The polymer is worked up as in Example 9. Yield: 43.7 g. of polymer with a relative viscosity (in chloroform) of 1.21. According to NMR-analysis, the molar ratio of acrylate to carbinol in the copolymer is 6:1.

EXAMPLE 12

80.0 g. of ethyl acrylate, 10.0 g. of acrylonitrile, 20.0 g. of p-isopropenylphenyl dimethyl carbinol are emulsified with stirring in 120 ml. of water in a nitrogen atmosphere, and the emulsion is polymerised for 5 hours at 40 to 50° C. following the addition of 0.05 g. of potassium persulphate and 0.02 g. of sodium sulphite. The resulting polymer is precipitated by pouring the emulsion into 500 ml. of methanol. Filtration, washing and drying leave 104.5 g. of a copolymer with relative viscosity (CHCl₃) of 1.45.

EXAMPLE 13

Following the addition of 0.02 g. of azodiisobutyronitrile, 40.0 g. of freshly distilled butyl acrylate and 10.0 g. of p-isopropenylphenyl dimethyl carbinol are polymerised for 20 hours at 70 to 80° C. in 100 ml. of xylene in a nitrogen atmosphere. Working up as in Example 10 leaves 36.0 g. of a polymer with a relative viscosity (CHCl₃) of 1.11. According to NMR-analysis, the molar ratio of acrylate to carbinol in the copolymer is 6:1.

EXAMPLE 14

A mixture of 35.0 g. of styrene, 5.0 g. of acrylonitrile and 10.0 g. of p-isopropenylphenyl dimethyl carbinol is polymerised for 5 hours at 40 to 50° C. in the presence of 0.02 g. of potassium persulphate and 0.01 g. of sodium sulphite as initiators, as in Example 12. Working up as in Example 12 leaves 47.2 g. of a polymer with an oxygen content of 1.76 to 1.80% by weight, corresponding to 19% by weight of carbinol in the polymer.

EXAMPLE 15

35.0 g. of ethyl acrylate and 15.0 g. of m-isopropenylphenyl dimethyl carbinol are polymerised for 22 hours at 70° C. in 50 ml. of xylene to which 0.02 g. of azodiisobutyronitrile have been added. Polymerisation is carried out in a nitrogen atmosphere. After precipitation in petroleum ether, washing and drying, 45.5 g. of a colourless polymer with a relative viscosity (CHCl₃) of 1.270 are obtained. According to NMR-analysis, the molar ratio of acrylate to carbinol is 6:1.

EXAMPLE 16

30.0 g. of ethyl acrylate, 10.0 g. of styrene and 10.0 g. of m-isopropenylphenyl dimethyl carbinol are emulsified with stirring in an aqueous solution of 0.5 g. of sodium lauryl sulphate and 75 ml. of water adjusted with ammonia to pH 8 to 8.5, in a nitrogen atmosphere, and, following the addition of 0.1 g. of potassium persulphate and 0.04 g. of sodium pyrosulphite, the resulting emulsion is polymerised for 2 hours at 60° C. and then for another 20 minutes at 80° C. At the end of this time, the reaction is almost quantitative and a colourless emulsion is obtained. After precipitation with approximately 2% by weight calcium chloride solution, washing and drying, a colourless powder soluble in toluene, dioxan and chloroform is obtained. The polymer is found by NMR-analysis to have a carbinol content of approximately 19% by weight.

EXAMPLE 17

30.0 g. of ethyl acrylate, 10.0 g. of styrene, 4.0 g. of p-isopropenylphenyl dimethyl carbinol and 6.0 g. of m-isopropenylphenyl dimethyl carbinol are polymerised for 21 hours at 80° C. in 50 ml. of xylene to which 0.5 g. of azodiisobutyronitrile has been added, in a nitrogen atmosphere. The reaction is then almost quantitative, giving a clear colourless polymer solution. According to NMR-analysis, the polymer has a carbinol content of approximately 20% by weight.

EXAMPLE 18

20.0 g. of β-hydroxypropyl methacrylate and 10.0 g. of m-isopropenylphenyl dimethyl carbinol are dissolved in 30 ml. of a mixture of equal parts of benzene and n-butanol, and the resulting solution is polymerised for 10 hours at 70 to 75° C. in a nitrogen atmosphere, following the addition of 0.1 g. of azodiisobutyronitrile. A polymer is precipitated by pouring the solution into petroleum ether. 13.0 g. of a colourless polymer are obtained. It is soluble in chloroform and contains approximately 30 mol percent of 1,3-disubstituted aromatic compounds, according to infra-red and NMR-spectra.

EXAMPLE 19

10.0 g. of ethyl acrylate, 20.0 g. of diethyl fumarate and 10.0 g. of m-isopropenylphenyl dimethyl carbinol are dissolved in 40 ml. of benzene, and the resulting solution is polymerised for 15 hours at 70 to 75° C. in a nitrogen atmosphere, following the addition of 0.1 g. of azodiisobutyronitrile. After precipitation in petroleum ether, 14.2 g. of a colourless polymer are obtained. It is soluble in chloroform and, according to infra-red and NMR-analysis, contains 37 mol percent of 1,3-disubstituted aromatic compounds.

EXAMPLE 20

20.0 g. of diethyl fumarate and 20.0 g. of m-isopropenylphenyl dimethyl carbinol are dissolved in 40 ml. of benzene, and the resulting solution is polymerised for 21 hours at 70 to 75° C. in a nitrogen atmosphere. Precipitation in petroleum ether gives 8.1 g. of a chloroform-soluble polymer approximately 50 mol percent of which is derived from 1,3-disubstituted aromatic compounds according to infra-red and NMR-analysis.

EXAMPLE 21

10.0 g. of ethyl acrylate, 20 g. of monoethyl fumarate and 10.0 g. of m-isopropenylphenyl dimethyl carbinol are dissolved in 40 ml. of benzene, and the resulting solution is polymerised for 8 hours at 70 to 73° C. in a nitrogen atmosphere, following the addition of 0.10 g. of azodiisobutyronitrile. Precipitation in petroleum ether gives 7.2 g. of a chloroform-soluble colourless polymer containing 30 mol percent of 1,3-disubstituted aromatic compounds, as determined by infra-red and NMR-spectroscopy.

EXAMPLE 22

10.0 g. of m-isopropenylphenyl dimethyl carbinol and 9 g. of butadiene are dissolved in 30 ml. of benzene, and, following the addition of 0.1 g. of azodiisobutyronitrile, the resulting solution is polymerised for 7 hours at 60 to 75° C. in a bomb tube. Precipitation in methanol gives 5.2 g. of a tacky, colourless and benzene-soluble polymer which contains 18 mol percent of 1,4-disubstituted aromatic compounds, as determined by infra-red and NMR-spectroscopy. The polymer has an oxygen content (3.31% O) of 16 mol percent (36% by weight). This value is highly consistent with the value determined by spectroscopy.

EXAMPLE 23

20.0 g. of N-methoxymethyl methacrylamide and 20.0 g. of m-isopropenylphenyl dimethyl carbinol are dissolved in 40 ml. of benzene, and the resulting solution is polymerised for 18 hours at 70 to 75° C. in a nitrogen atmosphere, following the addition of 0.01 g. of azodiisobutyronitrile. Precipitation in petroleum ether gives 13.7 g. of a viscous, sticky polymer which is soluble in chloroform and which, according to infrared and NMR-analysis, contains approximately 30% of 1,3-disubstituted aromatic compounds.

EXAMPLE 24

A copolymer of 40 g. of methyl methacrylate, 5 g. of acrylonitrile and 10 g. of p-isopropenyl phenyl dimethyl carbinol (prepared by heating the monomers with 1% by weight of azodiisobutyronitrile to a temperature of 80° C. in the same proportion by weight of xylene in a nitrogen atmosphere, a pale yellow powder being obtained after precipitation with petroleum ether and drying) is dissolved in chloroform. The resulting solution is applied to a glass plate and heated for 3 hours at 140° C. The resulting clear, colourless film is insoluble in chloroform and other conventional solvents, showing that the copolymer has been crosslinked.

EXAMPLE 25

A copolymer of 35 g. of ethyl acrylate and 15 g. of m-isopropenylphenyl dimethyl carbinol is dissolved in toluene, and 4.5% by weight of dibenzoyl peroxide (based on the solids content) is added to the resulting solution. After this solution has been applied to a glass plate and heated for 2 hours at 120° C., crosslinked films insoluble in toluene or chloroform are obtained.

EXAMPLE 26

A copolymer of 40 g. of ethyl acrylate and 10 g. of p-isopropenylphenyl dimethyl carbinol is dissolved in toluene, and 10% by weight (based on the solids content) of formic acid are added to the resulting solution. After this solution has been applied to a glass plate and heated for 2 hours at 120° C., crosslinked films insoluble in toluene and chloroform are obtained.

EXAMPLE 27

A copolymer of 40 g. of styrene and 10 g. of p-isopropenylphenyl dimethyl carbinol is dissolved in toluene. 6% by weight (based on the solids content) of phthalic anhydride are then added, after which the solution is applied to a glass plate and heated for 3 hours at 120° C. Crosslinked films insoluble in toluene are obtained.

EXAMPLE 28

A mixture of 30 g. of ethyl acrylate, 10 g. of styrene and 10 g. of p-isopropenylphenyl dimethyl carbinol is dissolved in 50 g. of xylene, and the resulting solution is polymerised for 25 hours at 80° C. in a nitrogen atmosphere following the addition of 0.5 g. of azodiisobutyronitrile. The conversion rate then amounts to 100%. A clear, colourless viscous solution with a solids content of 30% by weight is obtained. Firmly adhering, elastic, glossy and colourless coatings can be obtained from this solution by baking or stoving.

The catalysts and stoving conditions required to obtain lacquer films that are resistant to xylene, and hence crosslinked, are set out in Table 1.

TABLE 1

| Catalyst | Catalyst percent by weight | Stoving temperature, °C. | Stoving time, minutes |
|---|---|---|---|
| Di-tert.-butylperoxide | 3 | 150 | 30 |
| Tributyl phosphate | 1 | 150 | 30 |
| Titanium tetra-acetate | 0.5 | 150 | 30 |
| Stannous chloride | 0.5 | 150 | 30 |
| Pyridine hydrochloride | 0.1 | 150 | 30 |
| Monophenyl phosphate | 0.5 | 140 | 30 |
| Zinc chloride | 0.1 | 140 | 30 |
| Benzene phosphonic acid | 0.5 | 130 | 30 |
| Pyridine hydrochloride | 0.25 | 120 | 30 |

EXAMPLE 29

A mixture of 20 g. of ethyl acrylate, 4 g. of butyl acrylate, 14.5 g. of styrene, 1.5 g. of 2-hydroxypropyl methacrylate, 4 g. of p-isopropenylphenyl dimethyl carbinol and 6 g. m-isopropenylphenyl dimethyl carbinol is dissolved in 50 g. of xylene, and the resulting solution is polymerised for 20 hours at 80° C. in a nitrogen atmosphere following the addition of 0.5 g. of azodiisobutyronitrile. The conversion rate then amounts to 100%, and a clear, colourless viscous solution with a solids content of 50% by weight is obtained.

Hard, elastic firmly adhering and glossy coatings which are completely resistant to xylene can be obtained from this solution by stoving under the conditions set out in Table 1.

Some more possible stoving conditions are set out in Table 2.

TABLE 2

| Catalyst | Catalyst, percent by weight | Stoving temperature, °C. | Stoving time, minutes |
|---|---|---|---|
| o-Silicic acid tetraethyl ester | 1 | 160 | 30 |
| Maleic anhydride | 5 | 150 | 30 |
| Boron trifluoridetriethylamine | 2 | 150 | 30 |
| Acid calcium salts of phosphoric acid phenyl ester | 0.5 | 150 | 30 |
| Zinc acetate | 0.5 | 150 | 30 |

EXAMPLE 30

The pH of a solution of 0.5 g. of sodium lauryl sulphate as emulsifier and 0.1 g. of potassium persulphate as catalyst in 75 g. of water is adjusted with ammonia to a value of 8 to 8.5. A solution of 10 g. of m-isopropenylphenyl dimethyl carbinol in 30 g. of ethyl acrylate and 10 g. of styrene is then added. Following the addition of 0.035 g. of sodium pyrosulphite, the mixture is polymerised with vigorous stirring in a nitrogen atmosphere for 2 hours at 60° C. and then for 20 minutes at 90° C.

With a conversion rate of 100%, a colourless dispersion with a solids content of 40% by weight and a pH value of 4 is obtained.

Colourless, glossy, extremely hard and elastic coatings that are completely resistant to xylene can be obtained from this dispersion by stoving for 30 minutes at 150° C. in the absence of a catalyst.

EXAMPLE 31

A 15% by weight solution of glacial acetic acid is prepared from a copolymer, obtained as described in Example 25, comprising 70% by weight of ethyl acrylate and 30% by weight of m-isopropenylphenyl dimethyl carbinol. This solution has an iodine number of almost zero and hence does not have any free isopropenyl groups.

This solution is heated for 3 hours at reflux temperature after which it contains the theoretical quantity of free isopropenyl groups, as shown by its iodine number of 8 (calculated 6.5).

The copolymer containing free isopropenyl groups is precipitated with water, washed neutral and dried.

After mixing with 5% by weight of dibenzoyl peroxide, the polymer is moulded at 130° C. Colourless, solvent-resistant mouldings in which the copolymer is in the crosslinked state are obtained.

EXAMPLE 32

A solution of 5 g. of butyl acrylate, 2 g. of maleic anhydride, 3 g. of p-isopropenylphenyl dimethyl carbinol and 0.5 g. of azodiisobutyronitrile is heated to 80° C. in an open vessel. After about 5 minutes, polymerisation begins, being accompanied by foaming of the polymer.

A colourless foam with a unit weight of approximately 300 kg./m.$^3$ is obtained. The foam thus obtained is only very slightly swollen by chloroform for example, i.e. it is cross-linked.

EXAMPLE 33

A solution of 6 g. of methyl methacrylate, 1 g. of maleic anhydride, 1.5 g. of m-isopropenylphenyl dimethyl carbinol, 0.4 g. of azodiisobutyronitrile and 0.5 g. of toluene is heated to 75° C. in an open vessel.

Polymerisation begins after approximately 10 minutes and is accompanied by foaming, resulting in the formation of a colourless, hard crosslinked foam with a unit weight of approximately 350 kg./m.$^3$.

EXAMPLE 34

A solution of 11.4 g. of styrene, 22.8 g. of ethyl acrylate, 5.75 g. of maleic anhydride, 5.0 g. of m-isopropenylphenyl dimethyl carbinol, 5.0 g. of p-isopropenylphenyl dimethyl carbinol and 1.5 g. of azodiisobutyronitrile is polymerised for 7 hours at 45 to 50° C. A colourless, hard polymer is obtained which can be foamed by heating for 10 minutes at 180° C. to form a colourless, hard, fine-poured foam with a unit weight of 220 kg./m.$^3$. The foam is only slightly swollen after storage for 60 hours in chloroform and toluene, i.e. it is highly crosslinked.

EXAMPLE 35

A solution of 26.5 g. of ethyl acrylate, 8.5 g. of maleic anhydride, 15.0 g. of p-isopropenylphenyl dimethyl carbinol, 1.5 g. of azodiisobutyronitrile and 0.5 g. of di-tert.-butyl peroxide is polymerised for 8 hours at 45 to 48° C.

The colourless polymer can be foamed by heating to form colourless, hard foams of average pore size which are resistant to chloroform.

Where foaming is carried out in 5 minutes at 150° C., a unit weight of 300 kg./m.$^3$ is obtained, whilst heating for 15 minutes at 200° C. gives a unit weight of 140 kg./m.$^3$.

EXAMPLE 36

A suspension of 29 g. of methyl methacrylate, 3.0 g. of itaconic acid, 13.0 g. of m-isopropenylphenyl dimethyl carbinol, 1.5 g. of azodiisobutyronitrile and 0.3 g. of di-tert.-butylperoxide is polymerised as in Example 35.

If the resulting polymer is heated for 5 minutes at 200° C. a colourless, fine-pored foam with a unit weight of 180 kg./m.$^3$ is obtained.

Similar results are obtained by using 8.0 g. of fumaric acid or 7.0 g. of acrylic acid in place of itaconic acid.

EXAMPLE 37

A solution of 34.3 g. of methyl methacrylate, 5.7 g. of maleic anhydride, 10 g. of p-isopropenylphenyl dimethyl carbinol, 1.5 g. of azodiisobutyronitrile and 0.5 g. of di-tert.-butylperoxide is polymerised for 7 hours at 45° C.

On heating, the polymer is converted into colourless, hard, fine-pored foams which are hardly swollen at all by chloroform, i.e. they are highly crosslinked.

A similar polymer can be obtained by adding 5% by weight of cumene as an additional expanding agent.

The foams obtained by heating the polymer obtained in the presence of cumene are also highly crosslinked but have slightly larger pores and lower unit weights than the foams produced in the absence of cumene.

The dependence of the unit weights of the crosslinked foams upon the foaming conditions is illustrated in the following table:

| Foaming | | Unit weight, kg./m.³ | |
|---|---|---|---|
| Temperature, °C. | Time, minutes | Without cumene | With cumene |
| 150 | 5 | | 135 |
| 170 | 5 | 165 | 130 |
| 180 | 10 | 140 | 100 |
| 200 | 5 | 125 | 86 |
| 220 | 15 | 110 | 60 |

EXAMPLE 38

A mixture of 13.3 g. of methyl methacrylate, 2.4 g. of itaconic acid, 3.9 g. of p-isopropenylphenyl dimethylcarbinol and 0.55 g. of azodiisobutyronitrile is suspended in 20 g. of a 0.5% by weight aqueous polyvinyl alcohol solution, and the resulting suspension is polymerised by stirring for 15 hours at 50° C.

The resulting polymer is filtered off, washed with water and methanol and dried.

A colourless crosslinked foam with a unit weight of 77 kg./m.³ is obtained by heating for 5 minutes at 150° C. If the polymer is heated for 5 minutes at 180° C., the unit weight of the crosslinked foam is reduced to 58 kg./m.³.

EXAMPLE 39

5 g. of a copolymer of 70% by weight of ethyl acrylate and 30% by weight of p-isopropenylphenyl dimethyl carbinol together with 5% by weight of maleic anhydride (0.25 g.), are dissolved in chloroform and the resulting homogeneous solution is concentrated by evaporation in vacuo. The dried polymer is size-reduced into particles 0.1 to 0.5 mm. in diameter, and heated at 200° C. in a suitable test tube.

The granulate melts and at the same time is expanded into colourless foam. The reaction is over after 8 minutes. The resulting, cylindrical body is firmly cross-linked, can be swollen in chloroform, has a unit weight of 150 kg./m.³, small closed pores and a certain level of elasticity.

If the test is carried out with 10% by weight of maleic anhydride, a yellowish, very firm and tightly crosslinked sparingly foamed polymer with a unit weight of 480 kg./m.³ is obtained.

Although when only 1% by weight of maleic anhydride is used, the polymer initially expands on heating, it subsequently collapses. The resulting product is only slightly crosslinked and partly soluble.

EXAMPLE 40

5 g. of a copolymer of 80% by weight of styrene and 20% by weight of m-isopropenylphenyl dimethyl carbinol are intimately mixed with 3% by weight of maleic anhydride as described in Example 39. On heating at 210° C., a colourless, wide-pored brittle foam with a smooth surface and a unit weight of 250 kg./m.³ is obtained after a period of some 10 minutes.

EXAMPLE 41

If the 5% by weight of maleic anhydride used in Example 39 is replaced by 2% by weight of trioxane and 0.5% by weight of zinc chloride, similarly incorporated through the chloroform solution, a yellowish, wide-pored and elastic foam with a unit weight of 170 kg./m.³ is obtained after foaming for 7 minutes at 205° C.

EXAMPLE 42

If the maleic anhydride used in Example 40 is replaced by an equivalent quantity of titanic acid tetrabutyl ester, a yellowish foam that can be swollen in chloroform is obtained. It has a unit weight of 180 kg./m.³.

EXAMPLE 43

10 g. of a granulated copolymer of 75% by weight of methyl methacrylate, 10% by weight of acrylonitrile and 15% by weight of p-isopropenylphenyl dimethyl carbinol with a particle size of from 0.2 to 1 mm. are thoroughly mixed with 0.3 g. (3% by weight) of powdered maleic anhydride. The resulting mixture is poured into an aluminium beaker and placed in an oven heated at 200° C. for a period of 15 minutes. A colourless crosslinked foam with a unit weight of 200 kg./m.³ is obtained.

EXAMPLE 44

5 g. of a size-reduced copolymer of 80% by weight of methyl methacrylate and 20% by weight of p-isopropenylphenyl dimethyl carbinol (particle diameter ~0.3 mm.) are thoroughly mixed with 0.15 g. (3% by weight) of powdered maleic anhydride, and the resulting mixture is heated for 10 minutes at 190° C. A colourless, narrow-pored foam, with a unit weight of 80 kg./m.³ is obtained.

If 6% by weight of maleic anhydride are added, the unit weight of the foam rises to 160 kg./m.³.

What is claimed is:

1. Copolymers which comprise copolymerized units of 0.01 to 50 mol percent p- or m-isopropenylphenyl dimethyl carbinol or a mixture thereof and 50 to 99.99 mol percent of one or more olefinically unsaturated monomers.

2. Crosslinked polymers comprising 50 to 99.99 mol percent of copolymerised units derived from one or more olefinically unsaturated monomers and 0.01 to 50 mol percent of copolymerised units derived from m- or p-isopropenylphenyl dimethyl carbinol or mixtures thereof.

3. Foam plastics of crosslinked copolymers comprising 50 to 99.99 mol percent of copolymerised units from one or more olefinically unsaturated monomers and 0.01 to 50 mol percent of copolymerised units derived from m- or p-isopropenylphenyl dimethyl carbinol or mixtures thereof.

4. A process for the production of copolymers, which comprises radically copolymerising at least one copolymerisable olefinically unsaturated monomer with m- or p-isopropenylphenyl dimethyl carbinol or mixtures thereof.

References Cited

UNITED STATES PATENTS

| 2,242,516 | 5/1941 | Duval | 260—618 |
| 2,531,355 | 11/1950 | Emerson | 260—618 |
| 3,259,605 | 7/1966 | Krimm et al. | 260—80.3 |

MURRAY TILLMAN, Primary Examiner

W. J. BRIGGS, SR., Assistant Examiner

U.S. Cl. X.R.

260—29.6, 47, 78.5, 80.3, 80.75, 80.81, 82.1, 86.1, 88.1, 618